(12) United States Patent
Wobben

(10) Patent No.: US 7,625,185 B2
(45) Date of Patent: Dec. 1, 2009

(54) BEARING STRUCTURE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 431 days.

(21) Appl. No.: 10/567,186

(22) PCT Filed: Aug. 5, 2004

(86) PCT No.: PCT/EP2004/051720

§ 371 (c)(1),
(2), (4) Date: Jul. 18, 2006

(87) PCT Pub. No.: WO2005/011964

PCT Pub. Date: Feb. 10, 2005

(65) Prior Publication Data

US 2007/0140861 A1    Jun. 21, 2007

(30) Foreign Application Priority Data

Aug. 5, 2003   (DE) ............................... 103 36 461

(51) Int. Cl.
*F01D 5/14* (2006.01)
(52) U.S. Cl. .................................. 416/229 R; 416/226
(58) Field of Classification Search ............ 416/229 R, 416/229 A, 226, 223 A; 29/889.71
See application file for complete search history.

(56) References Cited

U.S. PATENT DOCUMENTS 3,219,123 A    11/1965  Stocker
3,237,697 A    3/1966   Ford et al. ................... 170/159
4,789,577 A    12/1988  Leone et al. ............... 428/34.5
4,798,549 A    1/1989   Hirsch .......................... 441/74
5,127,802 A *  7/1992   Carlson et al. .............. 416/226

FOREIGN PATENT DOCUMENTS

| DE | 1264266 | 3/1968 |
| DE | 2 109 934 | 9/1972 |
| DE | 4423115 A1 | 1/1996 |
| WO | WO 01/26899 A1 | 4/2001 |

* cited by examiner

*Primary Examiner*—Edward Look
*Assistant Examiner*—Dwayne J White
(74) *Attorney, Agent, or Firm*—Seed Intellectual Property Law Group PLLC

(57) ABSTRACT

The present invention concerns a bearing structure for a composite structure rotor blade having fiber strands which extend along the length of the rotor blade. Prefabricated, stiff components are provided in the composite structure. The invention further concerns a process for the production of a shaped body, in particular a rotor blade, of a fiber composite structure, comprising the following steps: producing shells forming the outer contour of the shaped body, producing bearing structures of fiber strands of predetermined length which are impregnated with a hardening composite material, and transporting the bearing structure into the shells. Therefore the object of the present invention is to develop a process of the above-defined kind in such a way that the exothermic reaction is restricted and the risk of undulations is reduced.

17 Claims, 3 Drawing Sheets

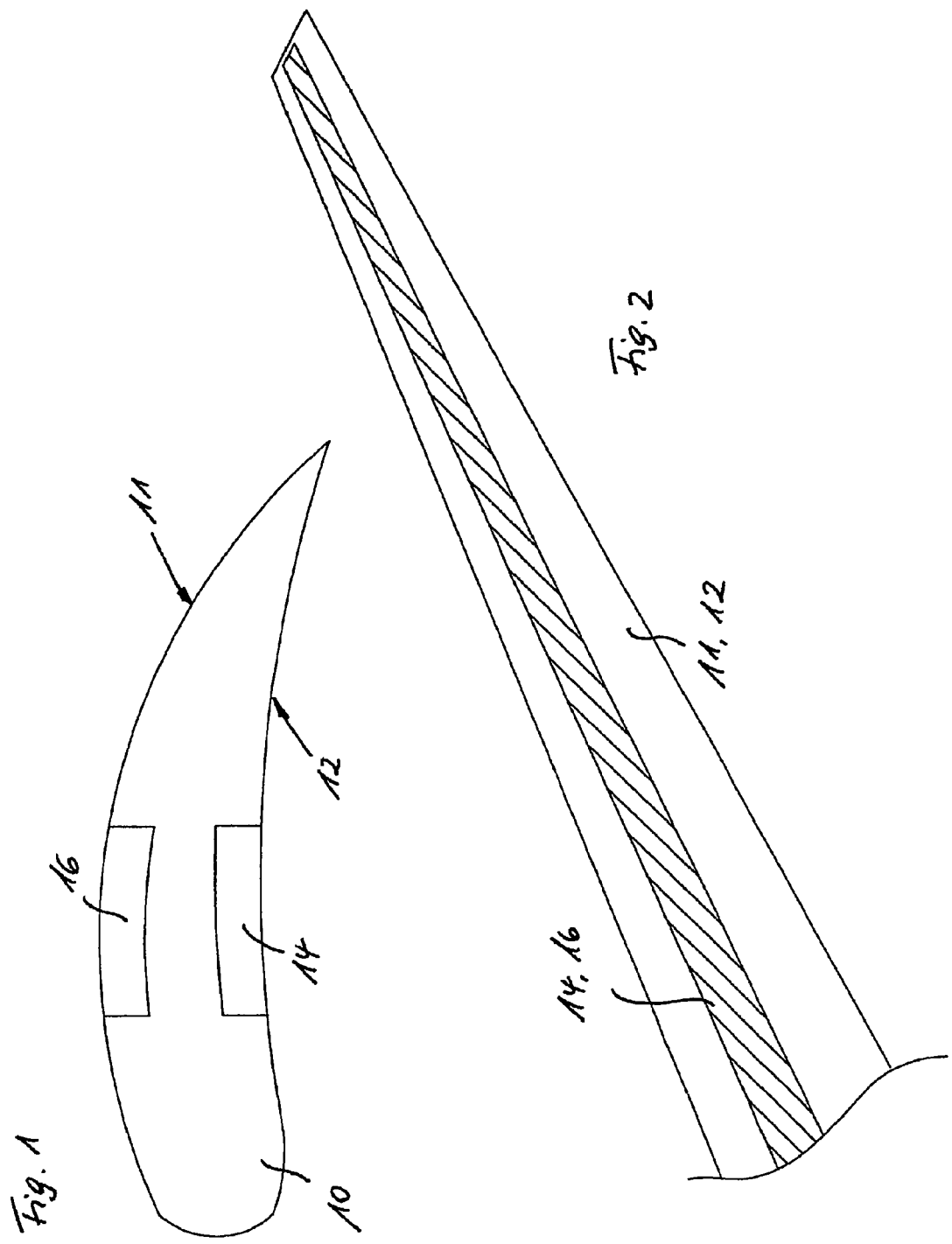

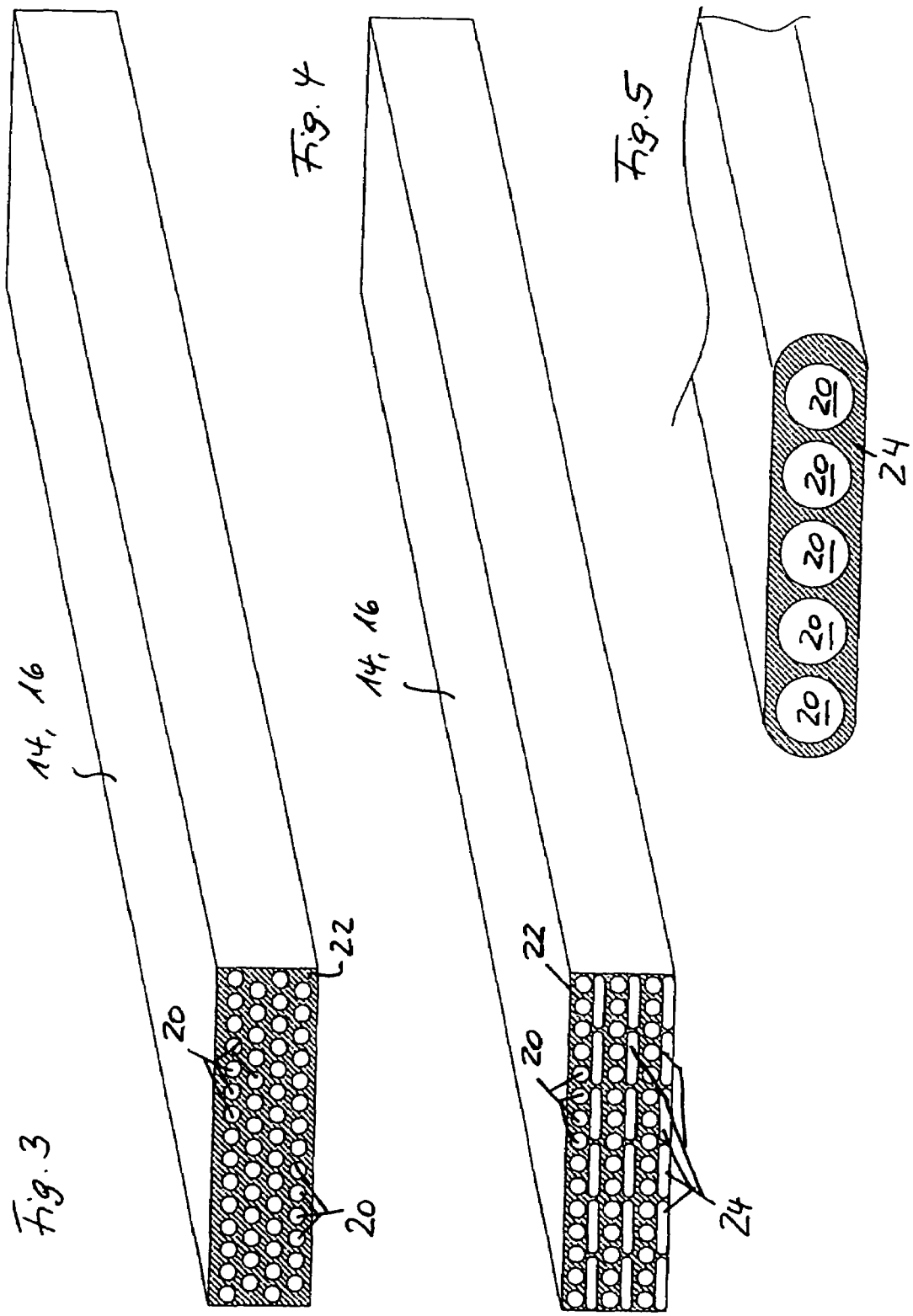

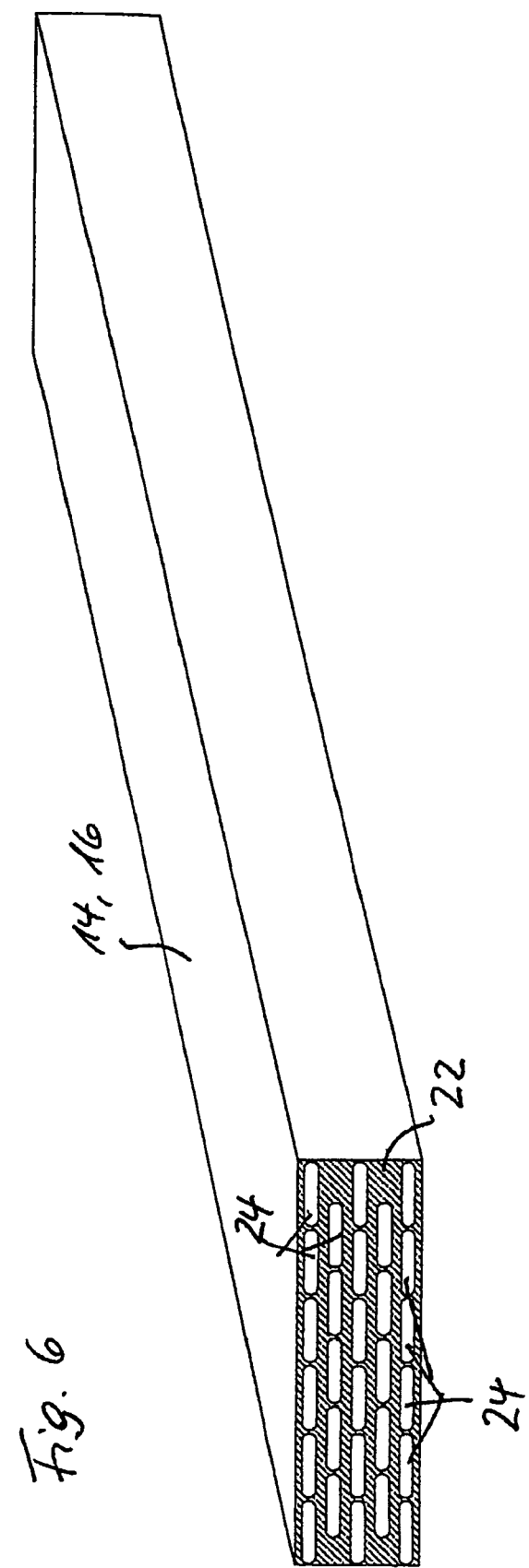

BEARING STRUCTURE

BACKGROUND OF THE INVENTION

1. Field of the Invention

The present invention concerns a bearing structure for a rotor blade of a wind turbine. In particular, the invention relates to a composite structure rotor blade. The invention further concerns a process for the production of a shaped body, in particular a rotor blade, of a fiber composite structure, comprising the following steps: producing shells forming the outer contour of the shaped body, producing bearing structures of fiber strands of predetermined length which are impregnated with a hardening composite material, and transporting the bearing structure into the shells.

2. Description of the Related Art

A process has long been known in the field of wind power to produce rotor blades with a dependable joining between the bearing structure and the shells forming the outer contour of the rotor blade as the same materials are used in each case.

In that respect, half-shell portions, for example of fiber composite material such as glass fiber and epoxy resin are produced, and these determine the external shape of the rotor blade. As such rotor blades often reach lengths of more than 50 meters, loads occur, which must be absorbed and dissipated. That is effected by way of the bearing structure provided in the rotor blade.

A known bearing structure comprises what are called roving webs. These involve strands of fiber material such as carbon fiber or, preferably because of the low cost, glass fiber. Those strands extend in part continuously over the entire length of the bearing structure or the rotor blade. The number of webs also increases with increasing proximity to the rotor blade root in order to absorb and dissipate the higher loads by virtue of a greater blade thickness and blade depth.

In order to achieve an adequate load-bearing capability, a suitably large number of those roving webs is used. They are impregnated with a polymer such as for example epoxy resin before being fitted into the prefabricated rotor blade shell. It will be appreciated that the impregnation operation can be effected equally by feeding the polymer from the outside and also by an injection process. The impregnated roving webs are then fitted into the shell of the rotor blade at the intended positions. As the rotor blade is made from the same material, there is an excellent join between the shell and the roving webs.

As those roving webs are laid 'wet' in the shell however deformations can easily occur in that procedure as those wet webs are not flexurally stiff. Such deformations are also referred to as 'undulations' and after hardening result in a spring effect at that location. That adversely affects the stiffness of the bearing structure or the rotor blade.

In addition, hardening of the polymer is an exothermic process in which heat is correspondingly given off to the exterior. In the case of bearing structures comprising a large number of roving webs, a correspondingly large amount of epoxy resin is also required in order to produce an adequate join. The exothermic reaction is correspondingly intensive and the amount of heat given off is correspondingly high.

As general state of the art attention is to be directed to DE 44 23 115 A1 and DE-AS No 1 264 266.

BRIEF SUMMARY OF THE INVENTION

Therefore one object of the present invention is to develop a process of the kind set forth in this specification such that the exothermic reaction is limited and the risk of undulations is reduced.

According to the invention, a bearing structure having the features of the claims and a process for the production of a shaped body having the features of the claims is provided.

In accordance with the invention, it is proposed that prefabricated, flexurally stiff components are integrated into a bearing structure. In that respect the invention is based on the realisation that prefabricated components, even if they are made up of a fiber composite system such as carbon fiber or glass fiber webs and a polymer, are already hardened and thus permit a corresponding reduction in the material which is to be processed wet, and thus lead to a reduced exothermic reaction. In addition those prefabricated components stiffen the wet constituents and thus contribute to reducing the undulations, that is to say the unwanted deformations of the fiber strands.

It will be appreciated that those prefabricated components can also comprise any other suitable material. In that respect a further advantage of using prefabricated components is that they can be separately produced and subjected to quality control.

The quality of those components, which is ensured in that way, and the low level of exothermy, also affords an overall improvement in the quality of the bearing structures.

Particularly preferably those prefabricated components are of a length which substantially corresponds to the length of the bearing structure to be constructed. That implements a continuous structure which also permits a continuous flow of force.

Advantageous embodiments of the invention are set forth in the appendant claims.

BRIEF DESCRIPTION OF THE SEVERAL VIEWS OF THE DRAWING(S)

The invention is described in greater detail hereinafter with reference to the Figures in which:

FIG. 1 shows a simplified view in cross-section through a rotor blade,

FIG. 2 shows a simplified internal view of a rotor blade shell,

FIG. 3 shows a simplified view of a known bearing structure,

FIG. 4 shows a simplified view of a bearing structure according to the invention, FIG. 5 shows a view on an enlarged scale in cross-section of a prefabricated component according to the invention, and FIG. 6 shows an alternative embodiment of a bearing structure according to the invention.

DETAILED DESCRIPTION OF THE INVENTION

Referring to FIG. 1 shown therein in simplified form in cross-section is a rotor blade 10 for a wind power installation. That rotor blade includes an upper shell 11 and a lower shell 12. Provided in those shells 11 and 12 are bearing structures 14, 16 which absorb and dissipate the loads acting on the rotor blade 10.

FIG. 2 is a simplified inside view of such a shell 11, 12. Provided at a predetermined position of a shell 11, 12 is a bearing structure 14, 16 which extends over the entire length of the shell 11, 12 and thus over the entire length of the rotor blade produced therefrom.

FIG. 3 once again shows in simplified form the structure of a known bearing structure 14, 16. That bearing structure is formed from fiber strands or bundles 20, sometimes called roving webs, which are enclosed by an epoxy resin 22. It will be appreciated that that fiber material for the fiber strands 20 can be a carbon fiber, glass fiber or any other suitable fiber. It is also to be noted that the round bundling of the roving webs 20, which is shown in this Figure, only serves for illustration purposes. In reality the bundles can be of any desired shape.

It can already be clearly seen in this Figure that a wet arrangement of webs 20 and epoxy resin 22 is subject to the risk of deformation, so-called undulations, particularly with the considerable lengths involved.

FIG. 4 shows an embodiment according to the invention of a bearing structure 14, 16. This bearing structure 14,16 also has roving webs 20 which are embedded in the epoxy resin 22. A plurality of prefabricated components 24 that are flexurally stiff are integrated with the fiber composite structure to form the bearing structure 14, 16. It will be noted that it is possible to clearly see here the prefabricated components 24 which are inserted into the bearing structure 14, 16 according to the invention. They can extend over the entire length and form layers which are capable of bearing and supporting the roving webs 20.

As the prefabricated components 24 are fully formed, dried and solid, they already exhibit their final flexural stiffness, and therefore, they form a support structure which prevents deformation of the roving webs 20. Accordingly, the bearing structures 14, 16 constructed therewith are of high quality.

FIG. 5 shows a cross-sectional view on an enlarged scale of one possible embodiment of a prefabricated component 24. As can be seen from this Figure, this prefabricated component 24 can again be made up of roving webs 20 and epoxy resin 22. It will be noted however that the prefabricated component 24 is already in the finished hardened condition at the time it is placed into the bearing structure 14, 16, and by virtue of the selection of material involved it results in an integral and intimate structure with the bearing structure 14, 16 and the strands 20 according to the invention and thus ensures a satisfactory flow of force.

FIG. 6 shows a second embodiment of a bearing structure 14, 16 according to the invention. In this case, the arrangement of the roving webs 20 between the prefabricated components 24 is not illustrated in this Figure, for simplification purposes. It can also be seen from this Figure that the prefabricated components 24 are here not arranged in individual columns one below the other but are arranged in displaced row-wise relationship with each other.

This arrangement results in even better strength for the bearing structure 14, 16 according to the invention.

The rotor blade according to the invention is distinguished by a considerably better level of stability by virtue of the use of the prefabricated components. In this case tensile forces can be absorbed, which are markedly higher than in the case of previous rotor blades.

The bearing structure is therefore made by providing shells 11 and 12 into which the bearing structures are placed. The bearing structures have wet strands 20, namely, strands that are impregnated with a liquid hardening composite material that is not yet dry. Adjacent to the wet strands 20, a plurality of prefabricated, stiff components 24 are placed. The entire combination is enclosed in an epoxy resin 22 that may, or may not include some fiber glass or other fiber material. The combination of the strands 20, epoxy resin 22 and prefabricated stiff components 24 harden together into an integrated bearing structure 14. A configuration of the invention has been described hereinbefore by means of a rotor blade, as a possible option for a shaped body. Besides just a rotor blade, the invention can also be very advantageously used for aircraft airfoils, ships and other shaped bodies, in respect of which, with a high level of strength, a high dynamic load-bearing capacity is nonetheless required.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation, comprising:
   a wind turbine configured to generate energy and including
      a rotor blade, the rotor blade including
         a fiber composite structure that forms the rotor blade;
         a bearing structure proximate to an outer surface of the rotor blade, the bearing structure having fiber strands of a predetermined length;
         a hardened composite material incorporated into the fiber strands; and
         a plurality of prefabricated, flexurally stiff components that are integrated with the bearing structure.

2. The wind installation of claim 1, wherein the bearing structure is at a load-bearing position in the fiber composite structure.

3. A process for the production of a rotor blade of a wind power installation, the process comprising:
   producing wind installation rotor blade shells forming an outer contour of a shaped body;
   producing a bearing structure of fiber strands and prefabricated flexurally stiff components, the fiber strands impregnated with a hardening composite material;
   placing the bearing structure into the shells; and
   encapsulating the bearing structure in an epoxy resin to form a rotor blade having the integrated bearing structure of fiber strands and prefabricated stiff components.

4. A process according to claim 3 characterized in that the prefabricated components are produced from fiber composite materials.

5. A process according to claim 3 characterized in that the prefabricated components have predetermined lengthes, wherein the lengths are dependent on the position of installation of the components in the shaped body.

6. A process according to claim 5 characterized in that prefabricated components are positioned in the shells such that the prefabricated components bear a significant portion of an applied load.

7. The process of claim 3, wherein producing the bearing structure includes encapsulating the fiber strands and the flexurally stiff components with a resin material while the hardening composite material is in a liquid state.

8. The process of claim 7, further comprising setting the resin material after placing the bearing structure into the shells.

9. The process of claim 3, further comprising impregnating the fiber strands with the hardening composite material in a liquid state.

10. A system for generating energy, the system comprising:
a wind power installation configured to generate energy and including a rotor blade, the rotor blade including an outer shell; and
a bearing structure being part of the outer shell, the bearing structure including
a plurality of fiber strands,
a hardened composite material incorporated into the plurality of fiber strands, and
a plurality of prefabricated, flexurally stiff components spaced apart from one another.

11. The system of claim 10, wherein the bearing structure further includes a matrix in which the plurality of fiber strands and the plurality of prefabricated, flexurally stiff components are embedded.

12. The system of claim 10, wherein the bearing structure is proximate to an outer surface of the rotor blade.

13. The system of claim 10, wherein the plurality of prefabricated, flexurally stiff components comprise a fiber composite material.

14. The system of claim 10, wherein the plurality of prefabricated, flexurally stiff components have elongated transverse cross-sections.

15. The system of claim 10, wherein the plurality of fiber strands are spaced apart from the plurality of prefabricated, flexurally stiff components.

16. A process for producing of a rotor blade of a wind power installation, the process comprising:
producing a rotor blade shell for a wind installation;
impregnating fiber strands with a hardening composite material;
producing a bearing structure comprising the fiber strands and prefabricated flexurally stiff components; and
placing the bearing structure into the blade shell such that the bearing structure is positioned at an outer periphery of the rotor blade.

17. The method of claim 16, wherein placing the bearing structure into the shell includes integrating the bearing structure into the shell such that the bearing structure is adjacent to an outer surface of the rotor blade.

* * * * *

UNITED STATES PATENT AND TRADEMARK OFFICE
CERTIFICATE OF CORRECTION

PATENT NO. : 7,625,185 B2 Page 1 of 1
APPLICATION NO. : 10/567186
DATED : December 1, 2009
INVENTOR(S) : Aloys Wobben It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Twenty-sixth Day of October, 2010

David J. Kappos
*Director of the United States Patent and Trademark Office*